H. T. CRAPO.
MEANS FOR SYNCHRONIZING TALKING MACHINES AND MOVING PICTURE MACHINES.
APPLICATION FILED JAN. 11, 1911.

1,080,265.

Patented Dec. 2, 1913.

H. T. CRAPO.
MEANS FOR SYNCHRONIZING TALKING MACHINES AND MOVING PICTURE MACHINES.
APPLICATION FILED JAN. 11, 1911.

1,080,265.

Patented Dec. 2, 1913.
4 SHEETS—SHEET 2.

Witnesses:
A. R. Appleman
Bessie Costigan

Inventor
Henry T. Crapo,
By his Attorney

H. T. CRAPO.
MEANS FOR SYNCHRONIZING TALKING MACHINES AND MOVING PICTURE MACHINES.
APPLICATION FILED JAN. 11, 1911.

1,080,265.

Patented Dec. 2, 1913.

Witnesses:

Inventor

H. T. CRAPO.
MEANS FOR SYNCHRONIZING TALKING MACHINES AND MOVING PICTURE MACHINES.
APPLICATION FILED JAN. 11, 1911.

1,080,265.

Patented Dec. 2, 1913.

UNITED STATES PATENT OFFICE.

HENRY T. CRAZO, OF NEW YORK, N. Y., ASSIGNOR, BY MESNE ASSIGNMENTS, TO THE WEBB TALKING PICTURES COMPANY, A CORPORATION OF DELAWARE.

MEANS FOR SYNCHRONIZING TALKING-MACHINES AND MOVING-PICTURE MACHINES.

1,080,265.  Specification of Letters Patent.  Patented Dec. 2, 1913.

Application filed January 11, 1911. Serial No. 602,269.

*To all whom it may concern:*

Be it known that I, HENRY T. CRAZO, a citizen of the United States, and resident of New York, in the county and State of New York, have invented certain new and useful Improvements in Means for Synchronizing Talking-Machines and Moving-Picture Machines, of which the following is a specification.

This invention relates to means for synchronizing or controlling the relative action of talking machines and moving picture machines, and it has for its object to provide an improved means or mechanism of this character whereby the sound and sight conditions of both machines can be governed and controlled in perfect relative co-action or synchronism, and which will enable such control or synchronism under all conditions of operation and under variable conditions which may exist or be encountered in the relation of the picture film with respect to the sound record.

In the drawings

Corresponding parts in all the figures are denoted by the same reference characters.

Referring to the drawings, 1 designates a moving picture machine of any usual construction.

Figure 1:
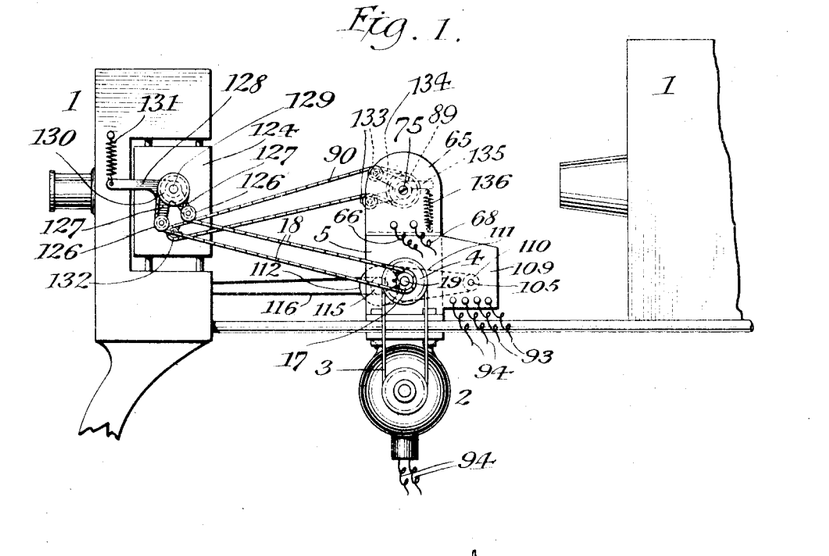
—Figure 1 is a side elevation illustrating in outline part of a moving picture machine and the connection thereof with my improved synchronizing means.
Figures 5, 12:
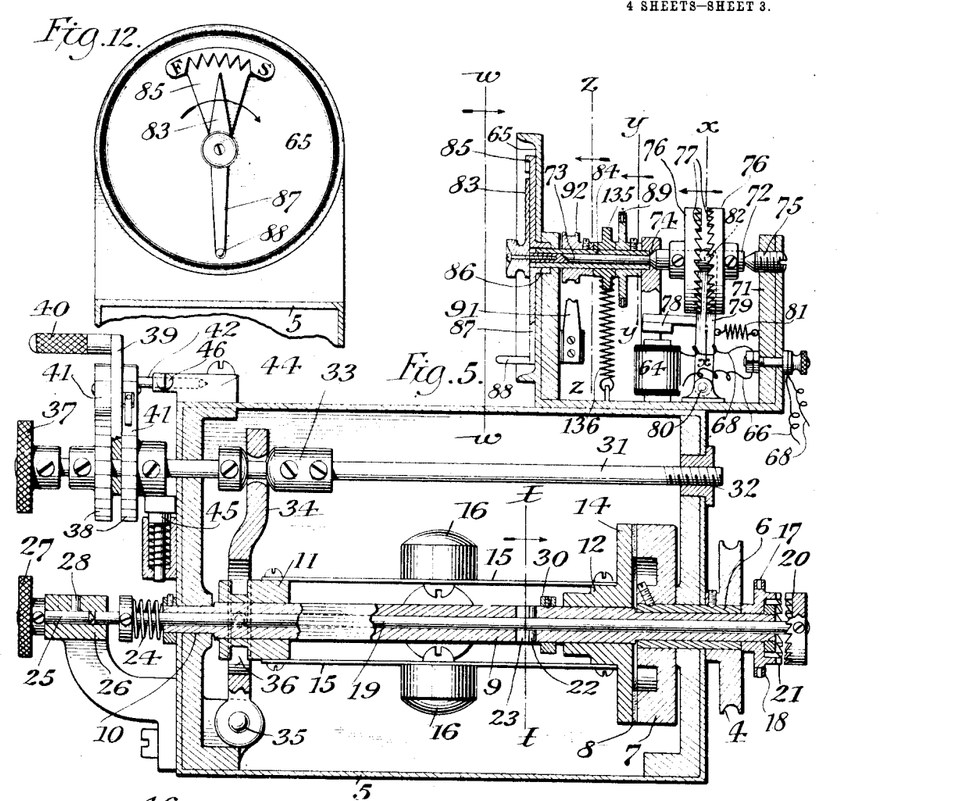
Fig. 5 is a detail cross-section of the governor mechanism for the speed control of the moving picture machine and of the indicator mechanism.
Fig. 12 is a cross-section on the line $w$—$w$, Fig. 5, showing a face view of the indicator mechanism.

2 designates a motor drive for the moving picture machine, which is in connection by a belt, 3, with a band-wheel, 4, of a governor mechanism. Said governor mechanism is suitably located, preferably adjacent to the moving picture machine, and comprises a friction mechanism and adjusting means therefor by which the speed of the moving picture machine can be conveniently controlled. In the preferred construction, as herein shown, the governor mechanism is partly inclosed in a suitable casing, 5, and the band-wheel 4 is carried by a sleeve, 6, having a bearing through said casing and carrying at its inner end a disk, 7, having a friction surface, 8. A shaft, 9, extends longitudinally through the casing 5 and has a bearing at one end therein, as at 10, and a bearing at the other end through the sleeve 6. Said shaft is of angular cross section between its bearings, and upon the same near one end is slidably mounted a head or block, 11, another block, 12, being slidably mounted at the other end of its angular portion and carrying a disk, 14, adapted to frictionally lock in contact with the friction surface 8 of the disk 7. Said blocks 11 and 12 are connected by a set of plate springs, 15, carrying suitable governing weights, 16. The action is therefore such that the revolution of the disk 7 will, in contact with the disk 14, cause the revolution of the shaft 9, and the centrifugal force exerted by the weights 16 will tend to draw the disk 14 from frictional contact with the disk 7 while the springs 15 tend to restore such contact, as will be readily understood.

Figure 9:
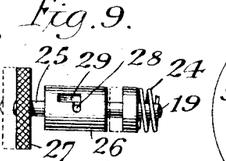
Fig. 9 is a detail side view of the locking means for the control of the operative connection of the governor mechanism with the moving picture machine.

Upon the cylindrical end of the shaft 9, beyond the sleeve 6, is mounted a loose sprocket-wheel, 17, in connection with the operating mechanism of the moving picture machine by a sprocket-chain, 18. Thus, normally, the motor drive will operate the governor mechanism without actuating the sprocket-wheel 17, which is adapted to be thrown into or out of operation, to govern the actuation of the moving picture machine by the motor drive, by means of suitable controlling mechanism. The preferred construction for the latter purpose comprises a rod, 19, extending longitudinally of the shaft 9 and slidably mounted in a longitudinal bore therein, which rod carries at one projecting end a ratchet disk, 20, adapted to engage a corresponding ratchet, 21, upon the sprocket-wheel 17. The rod 19 is locked in engagement with the shaft 9, for rotary action therewith, by means of a cross-pin, 22, projecting in an elongated slot, 23, in the shaft 9, which permits the slidable action of said rod. The rod 19 thus revolves with the shaft 9 and carries the ratchet disk 20, and when said rod is moved to bring the disk 20 in engagement with the ratchet of the sprocket-wheel 17 the latter is carried with the shaft 9 and operation communicated to the moving picture machine. Said rod is normally controlled, by a suitably-mounted spring, 24, to retain the ratchets 20 and 21 in engagement, and to lock said rod against this spring control, and with the ratchets 20 and 21 disengaged, a pin, 25, is slidably and turnably mounted in an extension, 26, from the casing 5 and bears against the end of said rod. Said pin 25 has a milled head, 27, by which it may be operated, and carries a laterally-projecting pin, 28, having a locking action in a right angular slot, 29, in the extension 26.

Upon the shaft 9, adjacent the block 12, is provided a fixed collar or projection, 30, acting as a stop for the slidable action of said block in the movement of the disk 14 away from the disk 7. The operative action of this stop 30, in the operation of the governor mechanism, is such that when the speed results in movement of the disk 14 from frictional engagement with the disk 7 the block 12 impacts against the stop 30 and the latter acts under the impact to throw the disk 14 back in its movement for frictional reëngagement with the disk 7. The action of the governor mechanism is thus such that the frictional engagement of the disk 14 is intermittent, its movement being intermittently to and from frictional contact with the disk 7, whereby the revolutions of the disk 14 and its shaft 9 are concurrently less than the revolutions of the disk 7 and its sleeve 6.

Figure 6:
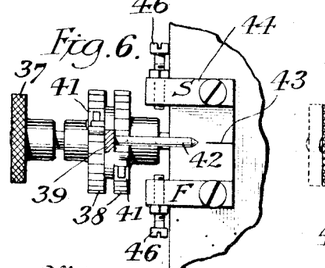
Fig. 6 is a detail top or plan view of the adjusting mechanism for the governor mechanism shown in Fig. 5.
Figure 7:
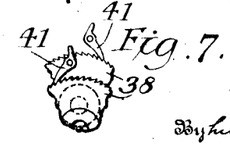
Fig. 7 is a detail perspective view illustrating the pawl and ratchet arrangement of said adjusting mechanism.
Figure 8:
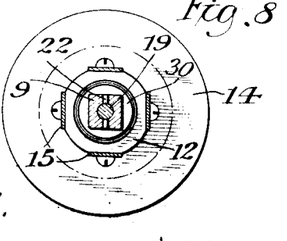
Fig. 8 is a detail cross-section on the line $t$—$t$, Fig. 5.

To effect adjustment of the governor mechanism with relation to the speed of the shaft 9, the relative normal positions of the slidable blocks 11 and 12, and the tensional status of the springs 15 resulting therefrom, is adjustable. The preferred construction for this purpose comprises a rod, 31, having a threaded mounting, as at 32, whereby it may be turnably held in position, and carrying a circumferentially-grooved collar, 33, the groove of which receives the free end of an arm, 34, pivotally mounted, as at 35, and engaging, beyond its pivot, a circumferential groove, 36, in the block 11. The arm 34 thus constitutes a lever, adjustable by turning of the rod 31 and held in fixed adjusted position thereby, and acting to retain the block 11 at a normal relative adjusted position. The rod 31 extends beyond the casing 5 and is provided at its end with a milled head, 37, by which it may be operated. In the operative status of the mechanism, the rod 31 is primarily adjusted to effect the desired adjustment of the governor mechanism with relation to the normal conditions of speed required for synchronized movement, and to govern fast or slow conditions which may exist under this primary status of adjustment, in the circumstances of synchronized operative action between the moving picture machine and the talking machine, a supplementary adjustment means is provided for employment while the mechanism is in operation. The preferred construction for the latter purpose comprises two ratchet disks, 38—38, carried by the rod 31 and having reverse ratchets, as shown in Fig. 7, and between these disks is mounted an arm, 39, free upon the rod 31 and turnable thereon and having an operating handle, 40. Said arm 39 carries, respectively at opposite sides, two reversely-mounted gravity or spring-actuated pawls, 41—41, adapted for convenient finger manipulation for disengagement from the ratchets and respectively engaging the reverse ratchets 38. Said arm 39 also carries a pointer, as at 42, projecting with relation to a guide point or scale, as at 43, upon a suitably mounted plate, 44. In the primary adjustment of the rod 31, by means of its milled head 37, the pointer 42 is set at the guide point 43, which is the center of the guide or scale, this positioning of the arm 39 and its pointer 42 being conveniently permitted by manipulating the pawls 41 to permit movement of the arm 39 without turning the ratchets 38. The adjustment of the governor mechanism is then in normal position for operation, but when it is desired to run fast or slow, according to any conditions of the synchronized operation of the moving picture machine and talking machine, the arm 39 is moved in one direction for faster adjustment and in the other direction for slower adjustment, during which movement one of the pawls 41 will engage and turn one of the ratchets 38 while the other pawl is held disengaged, and the turning of the ratchet will correspondingly turn the rod 31 for adjustment. Normally, the pawls 41 operate to lock the arm 39 in its adjusted position. A spring-controlled brake, 45, is preferably suitably mounted in bearing relation to the operative movement of the rod 31, to retain the same against accidental or unintentional variation in its position of desired adjustment and to enhance the delicate degree of adjustment to be effected in the rod 31 either by its milled head 37 or the action of the arm 39 and the pawl and ratchet mechanism. At each side the plane of movement of the swinging pointer 42, adjustable stops are preferably provided to limit the movement of said pointer 42 in either the fast or slow direction of adjustment and to govern such limits of adjustment independently if desired. In the preferred construction these stops are constituted by screws, as at 46, threaded in extensions of the plate 44 and serving in their adjusted position as a stop-contact for the pointer 42.

The approximate normal adjustment of the governor mechanism for the moving picture machine as above described, under ordinary conditions of usage, is preferably such that the motor drive 2 and the friction disk 7 which it directly operates have a speed of about eighteen hundred revolutions per minute, while the shaft 9 and its actuating means have a speed of about seven hundred and seventy-eight revolutions per minute in which the rod 19 and its ratchet 20 is carried, and the gear adjustment between the sprocket wheel 17 and the operating mechanism of the moving picture machine is regulated so that the latter has about nine hundred and sixty revolutions per minute and projects one picture of the film at each revolution.

Figure 10:
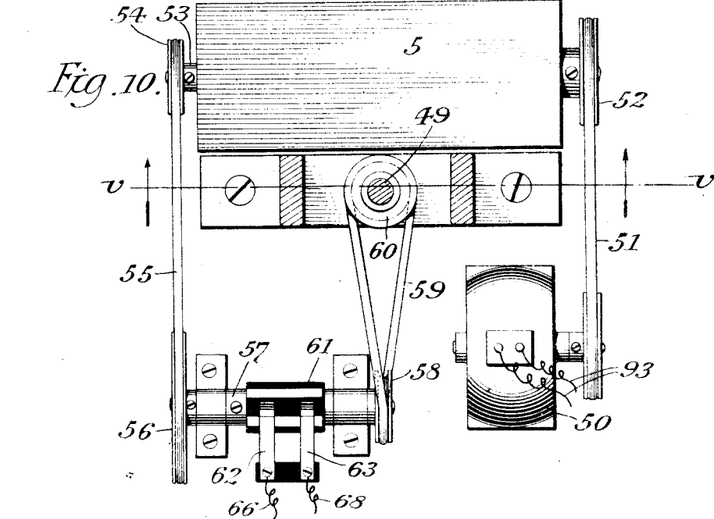
Fig. 10 is a top or plan view, partly in section, of the talking machine mechanism and its connection with the commutator of the indicator circuit.
Figure 11:
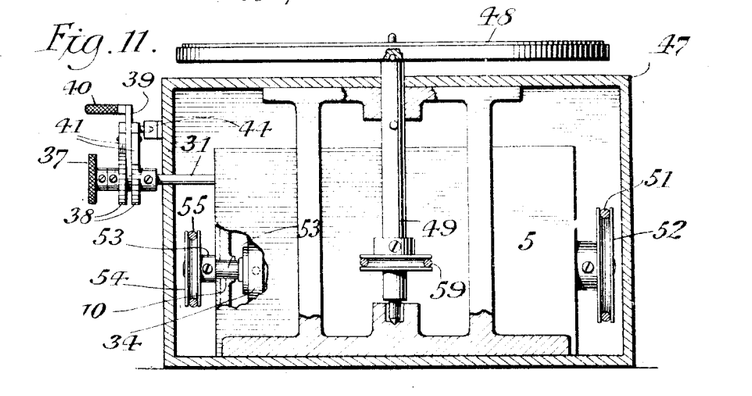
Fig. 11 is a vertical cross-section of the talking machine mechanism, on the plane of the line $v$—$v$, Fig. 10.
Figures 13, 14, 15:
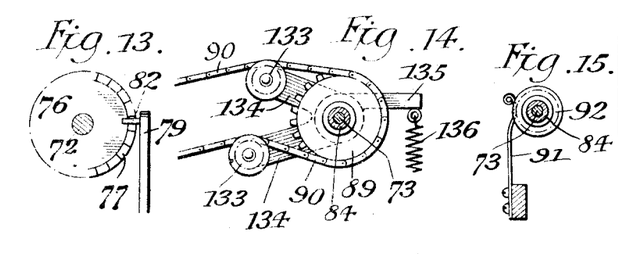
Fig. 13 is a cross-section on the line $x$—$x$, Fig. 5.
Fig. 14 is a cross-section on the line $y$—$y$, Fig. 5.
Fig. 15 is a cross-section on the line $z$—$z$, Fig. 5.

47 designates a talking machine, such as a phonograph, graphophone, or the like, having a revoluble sound record, as at 48. The shaft, 49, of the record 48, is operated by a motor drive, as at 50, which is in connection by a belt, 51, with a band-wheel, 52, carried by the main shaft, 53, of a governor mechanism. The construction of the governor mechanism for the talking machine is substantially the same as the governor mechanism for the moving picture machine, as above described, except that the rod 19 and its ratchet 20 and the associate parts, whereby the machine-drive sprocket-wheel or element 17 is thrown into or out of operation, is not employed, the conditions of relative operation being such that the talking machine can run continuously under action of its motor drive 50 and its starting and stopping can be controlled from the control mechanism of the moving-picture machine, as will be hereinafter described. The governor mechanism of the talking machine has the same primary and supplementary adjustment means as have been hereinbefore described with relation to the governor mechanism of the moving picture machine, and is preferably correspondingly housed in a suitable casing 5, and it is therefore not necessary to herein again describe and illustrate the details of such governor mechanism with relation to the talking machine. The drive mechanism for communicating the action of the main shaft 53 of the governor mechanism for the talking machine to operate the latter, has an intermediate commutator mechanism for controlling an electrical circuit in which is operatively arranged the indicator mechanism to be hereinafter described. The preferred construction for this communicating drive mechanism comprises a band-wheel, 54, which corresponds to the loose driving sprocket-wheel 17 in the governor mechanism as described for the moving picture machine, but said band wheel 54 is carried by said main shaft 53, at the end opposite from the main band-wheel 52, and is connected by a belt, 55, with a band-wheel, 56, carried by a suitably mounted shaft, 57, which shaft also carries a band-wheel, 58, in connection by a belt, 59, with a band-wheel, 60, upon the shaft 49 which carries the sound record.

The approximate normal adjustment and relation of the driving elements of the talking machine as above described, under ordinary conditions of usage, are preferably such that the motor drive 50 and the band-wheel 52 and the main friction disk of the talking-machine governor mechanism have a speed of about one thousand revolutions per minute, while the shaft 53 and its actuating means and the band-wheel 54 have a speed of about three hundred and fifty revolutions per minute, and from said band-wheel 54 the driving means is geared down so that the sound-record shaft 49 has about eighty revolutions per minute. The relationship of the drive of the moving picture machine and talking machine, as hereinbefore set forth, is thus approximately such that the pictures of the film are exposed during each revolution of the talking machine, this being the usual relative conditions of synchronism between the action of the picture machine and the talking machine under the ordinary conditions of construction and operation.

The commutator before referred to is carried upon the shaft 57 of the talking-machine drive, and is of any usual or adapted construction. As herein shown, said commutator, 61, comprises a make and break cylinder and two spring contacts, 62 and 63. The arrangement of the commutator is such, under the ordinary conditions of operation of the moving picture machine and talking machine and the synchronizing means herein described, that it has six makes and six breaks to each revolution of the talking-machine record, thus corresponding in its twelve periods of making and breaking the circuit to the exposure of one picture of the film for each make and each break, under the relative speed conditions hereabove set forth.

Figure 2:
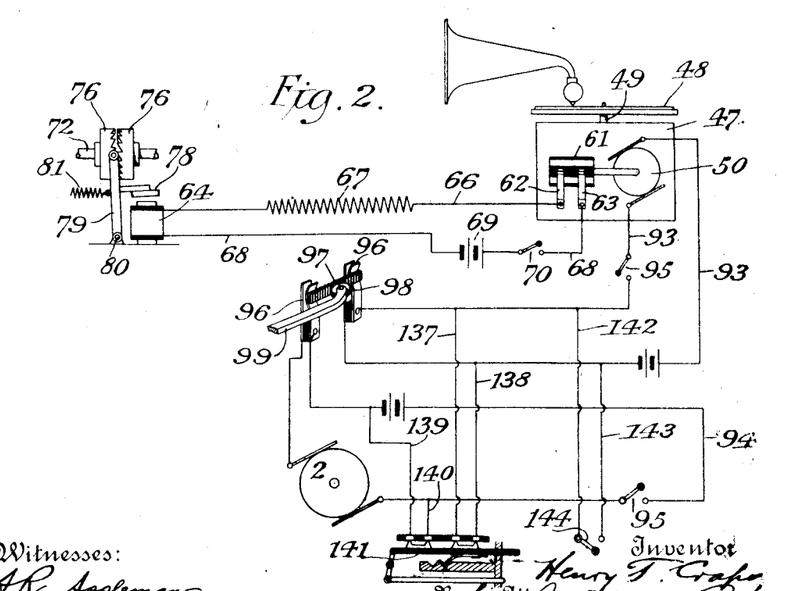
Fig. 2 is a diagrammatic view illustrating the circuit arrangements for the talking machine, moving picture machine, and indicating mechanism.

The contacts 62 and 63 of the commutator are comprised in an electrical circuit in which is arranged an electro-magnet, 64, by which the indicator mechanism is operated. Said magnet and indicator mechanism is arranged adjacent the moving picture machine, and is preferably mounted upon the casing 5 of the governor mechanism of the picture machine, as shown in Fig. 5, and it may be inclosed in a suitable supplementary casing, as shown at 65, in Fig. 1. A preferred arrangement of the indicator circuit is shown in Fig 2, in which a conductor, 66, extends from the commutator contact 62 through a resistance coil, 67, to the electro-magnet 64, and from the magnet a conductor, 68, extends through a battery, 69, to the commutator contact 63. A suitable switch, as at 70, is preferably arranged in this circuit, by which it may be thrown into and out of operation as desired.

The indicator mechanism comprises a suitable framework, 71, in which is mounted a shaft, 72, the forward portion of which is preferably reduced, as at 73, to form a thrust bearing, 74, said shaft being adjustable to its bearing 74 by a suitable set-screw bearing, as at 75. The shaft 72 carries two spaced disks, 76—76, which have a circular ratchet-edge at their respective inner faces, as at 77, which ratchets are relatively reversed so that they operate in reverse directions while the disks 76 are carried by the shaft 72 in the same direction. The armature, 78, of the magnet 64, is carried by an arm, 79, pivotally mounted beneath said armature, as at 80, and projecting at the side of the ratchet-disks 76. Said arm is controlled in its return movement by a spring, 81, and is provided at its free end with a pin, 82, projecting between the ratchet-disks 76 and operating with relation to the ratchets 77. As said arm 79 oscillates, under alternate action of the armature 78 and the spring 81, its pin 82 bears first with relation to one ratchet 77 and then with relation to the other ratchet 77 and by pressure upon the inclined faces of said reversed ratchets 77 causes the rotation of the shaft 72 in successive steps corresponding to the makes and breaks of the armature 78. The shaft 72 carries at its forward end a suitable pointer, 83, secured in connection with the shaft in any suitable manner. Upon the reduced portion 73 of the shaft 72 is revolubly mounted a sleeve, 84, carrying at its forward end a scale-plate, 85, underlying the pointer 83 so that the latter projects with relation to the scale-points upon the plate 85. Said scale-plate 85 is preferably mounted in connection with the end of the sleeve 84 by a friction socket, as at 86, and provided with a projecting arm, 87, having a finger hold, 88, by manipulation of which said plate may be turned upon its socket connection with the sleeve 84 to adjust its relative position under conditions or circumstances as may be required or desired. The sleeve 84 is actuated, to revolve in the same direction as the shaft 72, by connection with the moving picture machine, and in the preferred construction for this purpose a sprocket-wheel, 89, is carried by said sleeve and is in connection with the operating mechanism of the picture machine by a sprocket chain, 90. The relative adjustment of the actuating means for the sleeve 84, with relation to the normal conditions of synchronized operation of the moving picture machine and talking machine, is such that the scale-plate 85 and the pointer 83 will normally move at the same rate of speed and in the same direction, and any variation in this normal status will be indicated by the position of the scale with relation to the pointer 83, showing that the moving picture machine is fast or slow with respect to its synchronized relationship to the speed of the talking machine, which variable conditions are compensated for by adjustment of the governor mechanism of the picture machine, through the secondary adjustment means hereinbefore described, until the scale-plate 85 and the pointer 83 register a normal relative status. The indicator mechanism thus shows at all times the relative speed conditions between the picture machine and talking machine and any variation thereof, and the adjustment of the governor mechanism with reference to the status shown by the indicator mechanism provides for any desired regulation of the synchronized status under all conditions of operation and use. A spring pressure-brake, 91, bearing with relation to a suitable collar, 92, secured upon the sleeve 84, is preferably provided to enhance the uniform action of said sleeve.

Figures 3, 4:
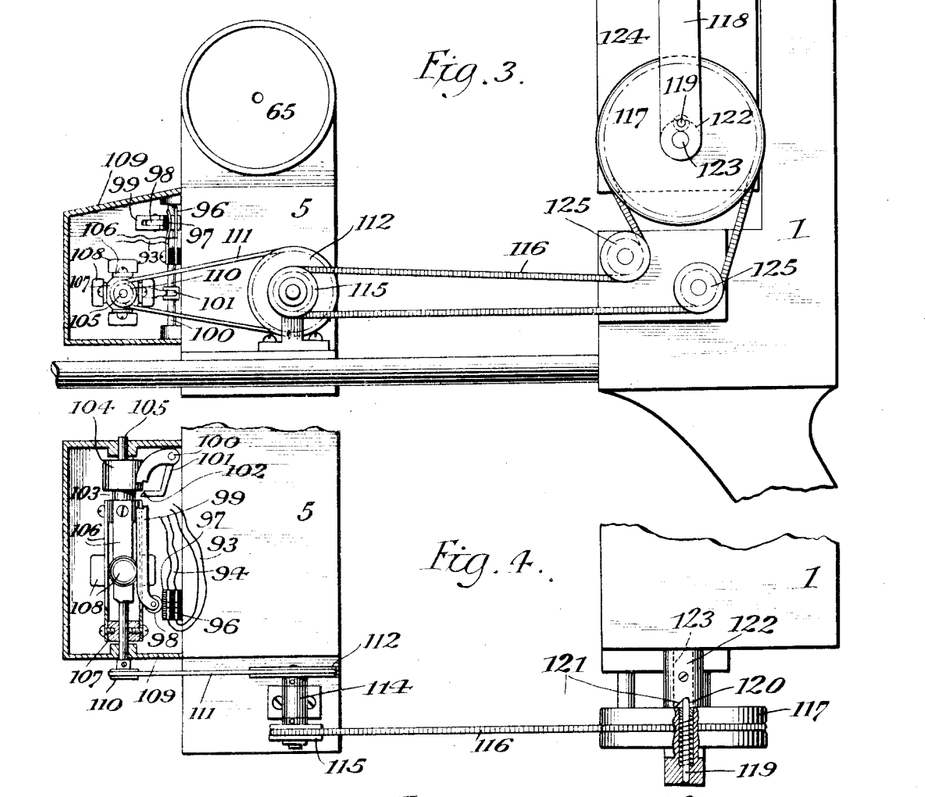
Fig. 3 is a detail side elevation, partly in section, illustrating the circuit-controlling mechanism which is in operative connection with the moving picture machine.
Fig. 4 is a top or plan view, partly in section, of the construction shown in Fig. 3.

The circuit of the motor drive 50 for the talking machine is shown at 93 and the circuit of the motor drive 2 for the moving picture machine is shown at 94, Fig. 2, and each of these circuits is preferably provided with a switch, as at 95, whereby they may be independently thrown into and out of operation as desired under any conditions or circumstances of use. These circuits 93 and 94 are broken at a switch mechanism, whereby both circuits may be simultaneously thrown into operation, to cause and maintain the relative operation of the moving picture machine and talking machine and the indicator mechanism, or thrown out of operation to cause the simultaneous stoppage of all of said parts of the apparatus. The preferred construction for the switch mechanism just referred to comprises a spring contact, 96, in each circuit 93 and 94, which contacts are conjointly operatable by a pressure bar, 97, of insulating material, against which bears a roller, 98, on the end of a lever arm, 99. The arm 99 is adapted to be governed in its operation by suitable rotary mechanism, and for this purpose it is carried by a shaft, 100, carrying a bell-crank projection, 101, having a beveled end, 102, normally received by a circumferential groove, 103, in a sleeve, 104, slidably mounted upon a shaft, 105, bearing at right angles to the shaft 100, whereby in the sliding action of said sleeve 104 the beveled end 102 will ride upon said sleeve from the groove 103 and cause the lever arm 99 to depress the bar 97, and upon the return movement of said sleeve 104 the beveled end 102 will be received by the groove 103 as the lever arm 99 releases pressure upon the bar 97 and returns to normal position. The sliding movement of the sleeve 104 is preferably controlled by a governor mechanism comprising plate springs, 106, secured to said sleeve and to a block, 107, carried by the shaft 105, said springs 106 being provided with the usual governing weights, 108. The switch mechanism and its controlling means, as just above described, is preferably housed within a suitable casing, 109, mounted upon the main casing 5 of the governor mechanism for the moving picture machine, as shown in Figs. 3 and 4, and a projecting end of the shaft 105 carries a band-wheel, 110, in connection by a belt, 111, with a band-wheel, 112, upon a suitably mounted shaft, 114.

In the employment of my improved synchronizing and controlling means for talking machines and moving picture machines, under the usual conditions of operation and requirements, the operation of the switch mechanism just above described is preferably controlled by a crank mechanism which is operatively related to the moving picture machine, and for this purpose the shaft 114 carries a band-wheel, 115, in connection by a belt, 116, with a band-wheel, 117, having an operating crank, 118. In its operative relationship to the moving picture machine, the crank mechanism just described has a catch connection whereby, when it is turned in normal direction, it will have an operative engagement with the operating mechanism of the moving picture machine, but the latter will be disengaged from the crank mechanism when its speed of operation is greater than that at which the crank mechanism is turned. Said catch mechanism preferably comprises a spring-actuated pin, 119, carried by the crank mechanism and positively engaging a shoulder, 120, in the normal direction of movement of the crank mechanism and sliding on an incline or bevel, 121, in the disconnecting movement.

Said shoulder and bevel are provided upon a sleeve, 122, fixed on a shaft, 123, of the operating mechanism of the picture machine, the crank mechanism being loosely mounted upon said shaft. Under the conditions of connection and disconnection as just stated, the crank mechanism can be operatively employed with relation to the operating mechanism of the moving picture machine, but the operation of the latter under action of its motor drive 2 will not affect the operation of the crank mechanism, and therefore should the speed of the operating mechanism of the moving picture machine be greater than that of the crank mechanism it will not increase the speed of the crank mechanism. The crank mechanism operates to govern the action of the switch mechanism for controlling the spring contacts 96 of the talking machine and picture machine circuits 93 and 94, and the operative action of said crank mechanism is adapted to be controlled entirely by hand, and its engagement and disengagement connection with the operating mechanism of the picture machine enables desired conditions of relative speed regulation, as will be readily understood. The arrangement above described also serves to enable the operation of the talking machine independent of any action of the picture machine, by opening the switch 95 of the picture machine circuit 94 and turning the crank mechanism in a reverse direction to actuate the switch mechanism for controlling the spring contact 96 of the picture machine circuit 93, under which conditions the picture machine will not be operated even though the crank mechanism is employed in maintaining the talking machine circuit.

It will be noted that the driving chain connections 18 and 90 between the motor drive and indicator mechanism and the operating mechanism of the moving picture machine, and the crank mechanism, are in connection with the slidable frame-up mechanism which is usually employed in moving picture machines, as shown at 124, and that under such circumstances a variable position of the chains 18 and 90 and the belt 116 must be provided for, for take-up and release of said chains and belt in compensation for variation in position of said slidable frame-up mechanism 124. For the purpose just stated, the belt 116 of the crank mechanism is passed around two guide pulleys, 125—125, mounted upon a fixed part of the frame of the moving picture machine, and said belt is constituted by a spring coil, as indicated in Figs. 3 and 4, while the sprocket chain 18 passes around two guide pulleys, 126—126, carried upon two arms, 127—127, of a bell-crank lever, 128, carried by the shaft 129, of the sprocket-wheel, 130, of the operating mechanism of the picture machine.

with which said chain 18 connects. Said bell-crank lever 128 is controlled by a spring, as at 131, and the action of the mechanism just described is therefore such that the chain 18 is kept taut by the guide pulleys 126, under movement of the bell-crank lever 128 and tension of the spring 131, in the variable positions of the slidable frame-up mechanism 124 of the picture machine. The sprocket chain 90 has a corresponding take-up means, which is reversely arranged with respect to the take-up means for the chain 18, said chain 90 passing from the sprocket-wheel, 132, of the operating mechanism of the picture machine, over guide pulleys, 133—133, carried upon arms, 134—134, of a bell-crank lever, 135, which is spring-controlled, as at 136, and mounted upon the sleeve 84 of the indicator mechanism.

Under some conditions of use, especially where the employment of the crank mechanism in connection with the moving picture machine is required, the crank mechanism as above described and the switch mechanism which it controls and the spring contact means 96 in the talking machine and picture machine circuits may be dispensed with, and said circuits can be opened or closed simultaneously by an ordinary switch. A simple arrangement for the purpose just indicated is shown in Fig. 2, in which branch wires, as at 137 and 138, extend from the respective sides of the talking machine circuit, and branch wires, as at 139 and 140, extend from the respective sides of the picture machine circuit, said wires being assembled at terminals convenient to the picture machine and adapted to be operated by a suitable snap switch, 141, by operation of which the talking machine and picture machine circuits can be opened and closed. A corresponding arrangement of branch wires may extend from the picture and talking machine circuits to terminals and a switch located convenient to the talking machine, if desired, whereby the circuits may be correspondingly controlled from the talking machine, as will be readily understood. I also prefer to carry branch wires, as at 142 and 143, from the talking machine circuit 93 to terminals and a switch, 144, convenient to the picture machine, whereby the talking machine circuit can be controlled from the picture machine, to start or stop the talking machine under circumstances or conditions which may make this action desirable. A corresponding arrangement of branch wires from the picture machine circuit 94 may also extend to terminals and a switch convenient to the talking machine, whereby the control of the picture machine circuit for starting or stopping may be governed from the talking machine, if desired, as will be readily understood.

It will be understood that should the conditions of synchronizing require increase in the speed of the picture machine beyond that effected by its motor drive, the picture machine could be speeded up by action of the crank mechanism; and that the connection of the crank mechanism with the switch 96—97 could be dispensed with, and the motor drives of the picture machine and talking machine circuits be kept in operation by action of the snap switch 141, under which circumstances the picture machine could be cut out from its motor drive at the ratchets 20 and 21 and run entirely by the crank mechanism, or the picture machine circuit could be opened at its switch 95 without affecting the operation of the talking machine circuit, and under these conditions the synchronizing will be shown by the indicating mechanism.

The operation and advantages of my invention will be readily understood by those skilled in the art to which it appertains.

In practice, the talking machine is usually mounted in rear of a screen or apron, in suitable position which may be upon the stage of a theater, and the moving picture machine is placed in front of the screen, usually in the balcony of a theater and therefore a considerable distance from the talking machine. The indicator mechanism, and the general controlling means for the synchronized operation, are arranged adjacent to the picture machine, in convenient position for manipulation by the operator of the picture machine. In the initial operative arrangement and adjustment of the apparatus, the governor mechanism for the motor drive of the picture machine is set in its primary adjustment to effect the desired normal rate of revolution of the picture machine mechanism (which is normally about nine hundred and sixty revolutions per minute, for the projection of one picture of the film at each revolution), and the governor mechanism of the talking machine is primarily adjusted to effect the desired normal rate of revolution of the sound-record (which is normally about eighty revolutions per minute). The relationship of the relative speeds just indicated is therefore normally such that twelve pictures are exposed during the period of one revolution of the sound-record. The relative adjustment of the indicator mechanism is such that the pointer 83 is advanced one step for each picture exposed, by action of the commutator operated by the picture machine mechanism, there being twelve step actions through said commutator and indicator mechanism to each revolution of the sound-record, and the scale-plate 85 is advanced one step for each picture exposed, through the action of its operating connection with the mechanism of the picture machine. Under the conditions of normal primary adjustment as above set forth, the talking machine and picture machine have a relative operation to produce synchronization between the pictures and sound-record, and the indicator members 83 and 85 move in unison in accordance with the conditions of synchronization. But variable conditions exist in the operation of the relatively adjusted mechanical means for synchronizing machines of this character, and variable relative conditions exist or are desired in the relationship of the sound-record and picture film, and my invention is therefore adapted to effectively meet such variable conditions and enable delicate adjustment and control to maintain under all circumstances the desired conditions of synchronism.

To start the operation, with the apparatus under the primary conditions of relative adjustment as above set forth, it is simply necessary to turn the crank 118, when the talking machine and moving picture machine circuits will be closed and both machines will be started in operation under synchronized conditions. It will of course be understood that the picture machine is thrown into and out of operation by its motor drive, through operation of the ratchet clutch 20 and 21, as desired. Likewise, the stoppage of the crank mechanism will cause the stoppage of the operation of the entire apparatus. When the apparatus is started in operation, as above set forth, its normal conditions of primary adjustment carry it in a synchronized movement, but should any variation occur it will be immediately indicated by the relative action of the indicator parts 83 and 85, which will show a fast or slow variation, and the latter can be at once compensated for by operation of the secondary adjustment means of the governor mechanism of the picture machine, to cause a normal relative position of the indicator parts 83 and 85 in which the picture machine will always be perfectly synchronized with the action of the sound-record. The governor mechanism of the talking machine can also be adjusted to fast or slow conditions, when desired or necessary, by action of its adjustment means as hereinbefore set forth. The secondary adjustment, during the operation of the apparatus, can also be effectively employed at any time where it is desired to regulate the operation with reference to variable conditions between the picture film and sound-record, in which action the indicator mechanism will always serve as a guide for the required conditions. The improved apparatus provides, in its operation and conditions of adjustment, for an effective synchronized action of the talking machine and picture machine to an extent which will not vary the relationship between the film and sound-record more than the degree of one picture, and all the various conditions of relative operation of the two machines under synchronized status are provided for in the general construction and arrangement of parts as comprised in my present invention and improvements.

Under some circumstances, with the improved mechanism comprised in my invention, a mechanical motor drive may be employed for either one or both the machines, or the picture machine may be driven entirely by the hand crank mechanism, it being understood that the indicator mechanism will always serve as a perfect guide to the required relative speed conditions for synchronized action. It will also be understood that the crank mechanism may be entirely dispensed with, where the operation of the moving picture machine is permitted entirely on a motor drive circuit, and that under these circumstances it will only be necessary to use an ordinary switch for controlling the circuits and starting and stopping the operation. The crank mechanism, in its relationship as herein shown and described, provides means whereby the action of the picture machine could be governed by the crank mechanism, though its normal conditions of operation through its motor drive would be independent of any operation of the crank mechanism.

I do not desire to be understood as limiting myself to the detail construction and arrangement of parts as herein shown and described, as it is manifest that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claims.

The mechanism comprised in my present invention and improvements enables operation under various conditions. For instance, in starting, the crank mechanism can be employed to turn the picture machine mechanism and, through its operative connection with the switch 96—97, cause the starting of the motor drives of both machines, while the picture machine is still disconnected from its motor drive, and then when the picture machine is cranked up to its relative speed step with respect to the speed of the talking machine, as shown by the indicating mechanism, the picture machine can be connected with its motor drive by throwing in the ratchets 20 and 21 and thereafter run without action of the crank mechanism. The picture machine can also, under some conditions of operation, be cut out from its motor drive and run entirely by the crank mechanism, under which circumstances the synchronizing will be shown by the indicating mechanism and the crank mechanism will maintain the operation of the circuit and motor drive of the talking machine by reason of the connection of the crank mechanism with the switch 96—97. When the mechanism is run under the conditions just stated, the motor drive of the picture machine can either continue in operation, with disconnection at the ratchets 20 and 21, or the picture machine circuit may be opened at the switch 95 to discontinue the motor drive in that circuit; or, under some conditions of this character of operation, the motor drive and circuit of the picture machine may be entirely dispensed with. Also, the connection of the crank mechanism with the switch 96—97 may be dispensed with, and the picture machine run by the crank mechanism, without any motor drive, and with the talking machine circuit and its motor drive maintained in operation by closing the switch 144, under which conditions the synchronizing will be shown by the indicating mechanism.

Having thus described my invention, I claim and desire to secure by Letters Patent:

1. In synchronizing mechanism of the class described, a talking machine, a moving picture machine, a motor drive for operating said machines, means for maintaining the operation in unison of the motor drive for said respective machines, governor mechanism for said motor drive means, means for adjusting said governor mechanism during operation, manual means for driving the moving picture machine, and means whereby said manual driving means controls the operative status of said means for maintaining the operation in unison of the motor drive for said respective machines.

2. In synchronizing mechanism of the class described, a talking machine, a moving picture machine, drive mechanism for the talking machine, drive mechanism for the moving picture machine, means for maintaining the operation in unison of said respective drive mechanism, governor mechanism for the drive mechanism of the moving picture machine, means for adjusting said governor mechanism during operation, manual means for independently driving the moving picture machine, and means whereby said manual driving means controls the operative status of said means for maintaining the operation in unison of said respective drive mechanisms.

3. In synchronizing mechanism of the class described, a talking machine, a moving picture machine, a motor drive mechanism for the talking machine, a motor drive mechanism for the moving picture machine, electrical circuit means for operating said motor drives, manually operatable means for governing the operation of said motor drives, and an adjustable automatic governor mechanism for controlling and varying the speed of said motor drive mechanisms.

4. In synchronizing mechanism of the class described, a talking machine, a moving picture machine, a motor drive mechanism for the talking machine, a motor drive mechanism for the moving picture machine, electrical circuit means for operating said motor drives, manually operatable means for governing the operation of said electrical circuit means to control simultaneous operation of said motor drives, automatically acting governor mechanism for said motor drive mechanism, and mechanical means comprised in said governor mechanism for adjusting said governor mechanism during operation.

5. In synchronizing mechanism of the class described, a talking machine, a moving picture machine, a motor drive mechanism for the talking machine, a motor drive mechanism for the moving picture machine, electrical circuit means for operating said motor drives, manually-operatable means for governing the operation of said electrical circuit means to control the simultaneous operation of said motor drives, and a mechanical governor mechanism for the motor drive mechanism, said mechanical governor mechanism having means for initially adjusting said governor mechanism and secondary means for adjusting said governor mechanism during operation.

6. In synchronizing mechanism of the class described, a talking machine, a moving picture machine, motor drive mechanism for operating said machines, means for maintaining the operation in unison of the motor drive for said respective machines, and manually-operatable means in operative association with the film mechanism of the moving picture machine for driving the same and governing the operation of said last-named means.

7. In synchronizing mechanism of the class described, a talking machine, a moving picture machine, motor drive mechanism for operating said machines, means for maintaining the operation in unison of the motor drive for said respective machines, and manually-operatable crank mechanism in operative association with the film mechanism of the moving picture machine for driving the same and in connection with said last-named means for governing the operation of the latter.

8. In synchronizing mechanism of the class described, a talking machine, a moving picture machine, a motor drive mechanism for the talking machine, a motor drive mechanism for the moving picture machine, electrical circuit means for operating said motor drives, mechanical means for governing the operation of said electrical circuit means to control the simultaneous operation of said motor drives, and manually-operatable means in operative association with the film mechanism of the moving picture machine for independently driving the same and governing the operation of said electrical circuit-controlling means.

9. In synchronizing mechanism of the class described, a talking machine, a moving picture machine, a motor drive mechanism for the talking machine, a motor drive mechanism for the moving picture machine, electrical circuit means for operating said motor drives, mechanical means for governing the operation of said electrical circuit means to control the simultaneous operation of said motor drives, and manually-operatable crank mechanism in operative association with the film mechanism of the moving picture machine for independently driving the same and in connection with said circuit-controlling means for governing the operation of the latter.

10. In synchronizing mechanism of the class described, a talking machine, a moving picture machine, a motor drive mechanism for the talking machine, a motor drive mechanism for moving picture machine, electrical circuit means for controlling the operation of said motor drives, manually operatable means for governing the operation of said electrical circuit means to control the simultaneous operation of said motor drives, and an indicating mechanism embodying relatively-operating elements respectively actuated by the speed movement of the talking machine and the moving picture machine.

11. In synchronizing mechanism of the class described, a talking machine, a moving picture machine, a motor drive mechanism for the talking machine, a motor drive mechanism for the moving picture machine, an electrical circuit for controlling the operation of the motor drive for the talking machine, an electrical circuit for controlling the operation of the motor drive for the moving picture machine, manually-operatable means for simultaneously controlling the operation of said circuits, mechanical governor mechanism for said motor drive mechanism, and mechanical means comprised in said mechanical governor mechanism for adjusting said governor mechanism during operation.

12. In synchronizing mechanism of the class described, a talking machine, a moving picture machine, a motor drive mechanism for the talking machine, a motor drive mechanism for the moving picture machine, an electrical circuit for controlling the operation of the motor drive for the talking machine, an electrical circuit for controlling the operation of the motor drive for the moving picture machine, manually-operatable means for simultaneously controlling the operation of said circuits, mechanical governor mechanism for said motor drive mechanism, mechanical means comprised in said mechanical governor mechanism for adjusting said governor mechanism during operation, and manually-operatable means in operative association with the film mechanism of the moving picture machine for independently driving the same and governing the operation of said circuit-controlling means.

13. In synchronizing mechanism of the class described, a talking machine, a moving picture machine, a motor drive mechanism for the talking machine, a motor drive mechanism for the moving picture machine, an electrical circuit for controlling the operation of the motor drive for the talking machine, an electrical circuit for controlling the operation of the motor drive for the moving picture machine, manually-operatable means for simultaneously controlling the operation of said circuits, mechanical governor mechanism for said motor drive mechanism, mechanical means comprised in said mechanical governor mechanism for adjusting said governor mechanism during operation, and an indicating mechanism embodying relatively-operating elements respectively actuated by the speed movement of the talking machine and the moving picture machine.

14. In synchronizing mechanism of the class described, a talking machine, a moving picture machine, a motor drive mechanism for the talking machine, a motor drive mechanism for the moving picture machine, an electrical circuit for controlling the operation of the motor drive for the talking machine, an electrical circuit for controlling the operation of the motor drive for the moving picture machine, manually-operatable means for simultaneously controlling the operation of said circuits, mechanical governor mechanism for said motor drive mechanism, mechanical means comprised in said mechanical governor mechanism for adjusting said governor mechanism during operation, an indicating mechanism embodying relatively-operating elements respectively actuated by the speed movement of the talking machine and the moving picture machine, and mechanically-operatable means in operative association with the film mechanism of the moving picture machine for independently driving the same and governing the operation of said circuit-controlling means.

15. In synchronizing mechanism of the class described, a talking machine, a moving picture machine, a motor drive for operating said machines, manually-operatable means for maintaining the operation in unison of the motor drive for said respective machines, mechanical governor mechanism for said motor drive means, mechanical means comprised in said mechanical governor mechanism for adjusting said governor mechanism during operation, and an indicating mechanism embodying relatively-operating elements respectively actuated by the speed movement of the talking machine and the moving picture machine.

16. In synchronizing mechanism of the class described, a talking machine, a moving picture machine, drive mechanism for the talking machine, drive mechanism for the moving picture machine, manually-operatable means for maintaining the operation in unison of said respective drive mechanism, mechanical governor mechanism for the drive mechanism of the moving picture machine, mechanical means comprised in said mechanical governor mechanism for adjusting said governor mechanism during operation, and an indicating mechanism embodying relatively-operating elements respectively actuated by the speed movement of the talking machine and the moving picture machine.

17. In synchronizing mechanism of the class described, a talking machine, a moving picture machine, a motor drive mechanism for the talking machine, a motor drive mechanism for the moving picture machine, electrical circuit means for operating said motor drives, manually-operatable means for governing the operation of said electrical circuit means to control the simultaneous operation of said motor drives, an adjustable mechanical governor mechanism for controlling and varying the speed of said motor drive mechanism, and an indicating mechanism embodying relatively-operating elements respectively actuated by the speed movement of the talking machine and the moving picture machine.

18. In synchronizing mechanism of the class described, a talking machine, a moving picture machine, a motor drive mechanism for the talking machine, a motor drive mechanism for the moving picture machine, electrical circuit means for operating said motor drives, manually-operatable means for governing the operation of said electrical circuit means to control the simultaneous operation of said motor drives, mechanical governor mechanism for said motor drive mechanism, mechanical means comprised in said mechanical governor mechanism for adjusting said governor mechanism during operation, and an indicating mechanism embodying relatively-operating elements respectively actuated by the speed movement of the talking machine and the moving picture machine.

19. In synchronizing mechanism of the class described, a talking machine, a moving picture machine, a motor drive mechanism for the talking machine, a motor drive mechanism for the moving picture machine, electrical circuit means for operating said motor drives, manually-operatable means for governing the operation of said electrical circuit means to control the simultaneous operation of said motor drives, mechanical governor mechanism for the motor drive mechanism, said mechanical governor mechanism having means for initially adjusting said governor mechanism, and secondary means for adjusting said governor mechanism during operation, and an indicating mechanism embodying relatively-operating elements respectively actuated by the speed movement of the talking machine and the moving picture machine.

20. In synchronizing mechanism of the class described, a talking machine, a moving picture machine, motor drive mechanism for operating said machines, means for maintaining the operation in unison of the motor drive for said respective machines, manually-operatable means in operative association with the film mechanism of the moving picture machine for driving the same and governing the operation of said last-named means, and an indicating mechanism embodying relatively-operating elements respectively actuated by the speed movement of the talking machine and the moving picture machine.

21. In synchronizing mechanism of the class described, a talking machine, a moving picture machine, motor drive mechanism for operating said machines, means for maintaining the operation in unison of the motor drive for said respective machines, manually-operatable crank mechanism in operative association with the film mechanism of the moving picture machine for driving the same and in connection with said last-named means for governing the operation of the latter, and an indicating mechanism embodying relatively-operating elements respectively actuated by the speed movement of the talking machine and the moving picture machine.

22. In synchronizing mechanism of the class described, a talking machine, a moving picture machine, a motor drive mechanism for the talking machine, a motor drive mechanism for the moving picture machine, electrical circuit means for operating said motor drives, mechanical means for governing the operation of said electrical circuit means to control the simultaneous operation of said motor drives, manually-operatable means in operative association with the film mechanism of the moving picture machine for independently driving the same and governing the operation of said electrical circuit-controlling means, and an indicating mechanism embodying relatively-operating elements respectively actuated by the speed movement of the talking machine and the moving picture machine.

23. In synchronizing mechanism of the class described, a talking machine, a moving picture machine, a motor drive mechanism for the talking machine, a motor drive mechanism for the moving picture machine, electrical circuit means for operating said motor drives, mechanical means for governing the operation of said electrical circuit means to control the simultaneous operation of said motor drives, manually-operatable rank mechanism in operative association with the film mechanism of the moving picture machine for independently driving the same and in connection with said circuit-controlling means for governing the operation of the latter, and an indicating mechanism embodying relatively-operating elements respectively actuated by the speed movement of the talking machine and the moving picture machine.

24. In synchronizing mechanism of the class described, a talking machine, a moving picture machine, means for effecting the drive in unison of said machines, an indicating mechanism embodying relatively-operating elements, an independent electrical circuit means controlled by the operation of the talking machine for actuating one of said elements, and mechanical means in operative connection with the film mechanism of the moving picture machine for actuating the other of said elements.

25. In synchronizing mechanism of the class described, a talking machine, a moving picture machine, means for effecting the drive in unison of said machines, manually-operatable mechanical means for adjusting the drive means during operation, an independent indicating mechanism embodying relatively-operating elements, an electrical circuit means controlled by the operation of the talking machine for actuating one of said elements, and mechanical means in operative connection with the film mechanism of the moving picture machine for actuating the other of said elements.

26. In synchronizing mechanism of the class described, a talking machine, a moving picture machine, means for effecting the drive in unison of said machines, an indicating mechanism embodying relatively operating elements, a commutator operated by the speed movement of the talking machine, an independent electrical circuit means controlled by said commutator for actuating one of said indicating elements, and mechanical means in operative connection with the film mechanism of the moving picture machine for actuating the other of said indicating elements.

27. In synchronizing mechanism of the class described, a talking machine, a moving picture machine, means for effecting the drive in unison of said machines, manually-operatable mechanical means for adjusting the drive means during operation, an indicating mechanism embodying relatively-operating elements, a commutator operated by the speed movement of the talking machine, an independent electrical circuit means controlled by said commutator for actuating one of said indicating elements, and mechanical means in operative connection with the film mechanism of the moving picture machine for actuating the other of said indicating elements.

28. In synchronizing mechanism of the class described, a talking machine, a moving picture machine, means for effecting the drive in unison of said machine, and mechanical governor mechanism for said drive mechanism, said mechanical governor mechanism having means for initially adjusting said drive means for the variable relative speeds of said respective machines and secondary means for adjusting said drive means during operation.

29. In synchronizing mechanism of the class described, a talking machine, a moving picture machine, means for effecting the drive in unison of said machines, mechanical governor mechanism for said drive mechanism, said mechanical governor mechanism having means for initially adjusting said drive means for the variable relative speeds of said respective machines, and secondary means for adjusting said drive means during operation, and an indicating mechanism embodying relatively-operating elements respectively actuated by the speed movement of the talking machine and the moving picture machine.

30. In synchronizing mechanism of the class described, a talking machine, a moving picture machine, means for effecting the drive in unison of said machines at variable relative speeds, governor mechanism for said drive means, means for adjusting said governor mechanism during operation, independent means for driving the moving picture machine, and means whereby said independent driving means controls the operative status of said means for effecting the drive in unison of said machines.

31. In synchronizing mechanism of the class described, a talking machine, a moving picture machine, means for effecting the drive in unison of said machines at variable relative speeds, governor mechanism for said drive means, means for initially adjusting said governor mechanism, secondary means for adjusting said governor mechanism during operation, independent means for driving the moving picture machine, and means whereby said independent driving means controls the operative status of said means for effecting the drive in unison of said machines.

32. In synchronizing mechanism of the class described, a talking machine, a moving picture machine, means for effecting the drive in unison of said machines at variable relative speeds, mechanical governor mechanism for said drive means, said mechanical governor mechanism having means for initially adjusting said governor mechanism, and secondary means for adjusting said governor mechanism during operation, and an indicating mechanism embodying relatively-operating elements respectively actuated by the speed movement of the talking machine and the moving picture machine.

33. In synchronizing mechanism of the class described, a talking machine, a moving picture machine, means for effecting the drive in unison of said machines at variable relative speeds, governor mechanism for controlling the speed of the drive means of one of said machines, means for regulating said governor mechanism during operation to vary the speed of one machine with relation to that of the other, independent means for driving the moving picture machine, and means whereby said independent driving means controls the operative status of said means for effecting the drive in unison of said machines.

34. In synchronizing mechanism of the class described, a talking machine, a moving picture machine, electrical circuit means controlling the drive of the talking machine, means for controlling said circuit, an indicating mechanism embodying relatively-operating elements, means for actuating one of said elements by the speed movement of the talking machine, means for actuating another of said elements by the speed movement of the moving picture machine, means for independently driving the moving picture machine, and means in connection with said driving means of the moving picture machine for operating the controlling means of the electrical circuit which governs the operation of the talking machine.

35. In synchronizing mechanism of the class described, a talking machine, a moving picture machine, an indicating mechanism embodying relatively-operating elements, means for actuating one of said elements by the speed movement of the talking machine, means for actuating another of said elements by the speed movement of the moving picture machine, an electrical circuit controlling the drive of the talking machine, a switch in said circuit, mechanical means in operative association with the moving picture machine for independently driving the same, and means operated by said mechanical driving means for controlling said switch.

36. In synchronizing mechanism of the class described, a talking machine, a moving picture machine, an indicating mechanism embodying relatively-operating elements, an independent electrical circuit means for actuating one of said elements by the speed movement of the talking machine, means for actuating another of said elements by the speed movement of the moving picture machine, a motor drive for the talking machine, an electrical circuit controlling said motor drive, a switch in said circuit, mechanical means in operative association with the moving picture machine for independently driving the same, and means operated by said mechanical driving means for controlling said switch.

37. In synchronizing mechanism of the class described, a talking machine, a moving picture machine, an indicating mechanism embodying relatively-operating elements, means for actuating one of said elements by the speed movement of the talking machine, means for actuating another of said elements by the speed movement of the moving picture machine, means for driving the talking machine independent of the drive of the moving picture machine, and means for driving the moving picture machine independent of the drive of the talking machine, said drive means for the moving picture machine embodying means for controlling the starting and stopping of the drive means for the talking machine.

38. In synchronizing mechanism of the class described, a talking machine, a moving picture machine, means for driving the talking machine independent of the drive of the moving picture machine, mechanical means in operative association with the moving picture machine for driving the same independent of the drive of the talking machine, and means in operative connection with said mechanical drive means for controlling the starting and stopping of the drive means for the talking machine.

39. In synchronizing mechanism of the class described, a talking machine, a moving picture machine, means for driving the talking machine independent of the drive of the moving picture machine, mechanical means in operative association with the moving picture machine for driving the same independent of the drive of the talking machine, means in operative connection with said mechanical drive means for controlling the starting and stopping of the drive means for the talking machine, and an indicating mechanism in operative connection with the talking machine and moving picture machine for indicating the relative speed movements thereof.

In testimony whereof I have signed my name in the presence of the subscribing witnesses.

HENRY T. CRAPO.

Witnesses:
WILLIAM D. REED,
JOS. REED LITTELL.